United States Patent
Redick (10) Patent No.: US 8,904,965 B1
(45) Date of Patent: *Dec. 9, 2014

(54) PET WASHING APPARATUS

(71) Applicant: Kevin L. Redick, Homewood, IL (US)

(72) Inventor: Kevin L. Redick, Homewood, IL (US)

( * ) Notice: Subject to any disclaimer, the term of this patent is extended or adjusted under 35 U.S.C. 154(b) by 124 days.

This patent is subject to a terminal disclaimer.

(21) Appl. No.: 13/676,312

(22) Filed: Nov. 14, 2012

Related U.S. Application Data (63) Continuation-in-part of application No. 12/701,514, filed on Feb. 5, 2010, now Pat. No. 8,371,248.

(51) Int. Cl.
  *A01K 13/00* (2006.01)
  *A47B 3/02* (2006.01)

(52) U.S. Cl.
  USPC .......................................... 119/671; 119/753

(58) Field of Classification Search
  USPC ......... 119/671, 753, 673, 674, 474, 513, 499, 119/498, 754, 756, 757, 755; 108/91, 115
  See application file for complete search history.

(56) References Cited

U.S. PATENT DOCUMENTS

| | | | | |
|---|---|---|---|---|
| 1,897,321 A * | 2/1933 | Mitchell et al. | .................... | 108/4 |
| 2,265,105 A * | 12/1941 | Farrington | ........................ | 108/4 |
| 3,577,936 A * | 5/1971 | Emery | ............................. | 108/8 |
| 3,935,600 A * | 2/1976 | Scribner | ........................... | 4/495 |
| 4,975,992 A * | 12/1990 | Patterson et al. | ................. | 4/599 |
| 6,553,943 B1 * | 4/2003 | Murphy | ........................ | 119/673 |
| 7,241,250 B1 * | 7/2007 | French et al. | .................... | 482/54 |
| 8,267,477 B1 * | 9/2012 | Appiah Finn | ............ | 297/423.41 |
| 2009/0300844 A1 * | 12/2009 | Taylor | ............................... | 5/607 |

* cited by examiner

*Primary Examiner* — Yvonne Abbott

(57) ABSTRACT

A self-contained pet washing and grooming apparatus is disclosed. The apparatus includes a base, a top member which is a grooming compartment, side supports, and a flexible side wall. In various embodiments, a water line brings water in from a water source such as a sink faucet. The water line is attached to a nozzle. A drain tray is placed over the base so that water used within the apparatus drains through the drain tray into the base. A pump is provided in the base to pump water out of the base through a water exit line, for example, into a sink drain. The device has a power source, and is collapsible such that the drain tray, side support and grooming compartment all collapse and fit within the base. Extension legs attached underneath the base are also collapsible. Optionally, the base has a handle and wheels.

20 Claims, 8 Drawing Sheets

PET WASHING APPARATUS

CROSS-REFERENCE TO RELATED APPLICATIONS

This application claims priority to U.S. Provisional Application No. 61/150,170, filed Feb. 5, 2009, which is hereby incorporated by reference herein in its entirety.

BACKGROUND OF THE INVENTION

1. Field of the Invention

The present invention relates to an apparatus for washing a pet, and more particularly, to a self-contained pet washing and grooming apparatus that is compact, collapsible and has its own power source to utilize electric tools. The apparatus also has a grooming compartment for the storage of grooming tools and accessories and extension legs for flexibility with bathing or grooming an animal.

2. Background

Various devices have been used for grooming or bathing pets. For example, U.S. Pat. No. 5,213,064, issued to Mondine et al., discloses an animal bath apparatus. The apparatus is shaped like a box. While the device could be used to bathe a pet from the top, it does not provide for drainage of used bath water nor does it connect to a sink faucet. Furthermore, it is not collapsible and thus it is cumbersome to move around and takes up significant storage space. It also does not provide a power source, grooming compartment or extension legs.

U.S. Pat. No. 5,243,931, issued to McDonough, discloses a tub to be used for washing an animal. However, again, the device takes up significant space and drainage is through the bottom only. Additionally, it does not connect to a sink faucet, is not collapsible and does not provide a power source, grooming compartment or extension legs.

Numerous other apparatus have been proposed. However, none of them is particularly compact, provide a self-contained unit, offer grooming convenience, nor do they provide a useful way to handle drainage issues and do not have their own power source.

Thus, there remains a need for a pet washing and grooming apparatus which is collapsible, compact, easily portable, and provides a convenient and sanitary way to wash and groom a pet.

SUMMARY

The present invention is a self-contained pet washing and grooming apparatus. The apparatus provides a convenient and sanitary device to wash and groom a pet, such as a dog or animal, in a portable and collapsible unit.

The pet washing and grooming apparatus of the present invention includes a base, side support members, a power source, a top member which is a grooming compartment, and extension legs connected to the base. The side support members, ideally rigid rod supports, such as a scissor lift or telescoping lift, are collapsible and fit within a track in the base. The power source is attached to the outside of the base. The top member and rigid rod supports can be collapsed to fit within the base, making the apparatus very compact, portable, and easy to store. Extension legs that fit within a track underneath the base and top member are also collapsible.

A water line is used to bring water from a water source to a water line adapter which then goes to a water dispensing device such as a spray nozzle. The nozzle may be mounted to the top member, and may be movable and removable. The water line can include a tube which can be internally or externally connected to a water source such as a sink faucet or an internal reservoir.

In various embodiments, the top member functions as a cover and a grooming compartment. The grooming compartment may be used to store grooming tools, such as a dryer, clippers, shampoo or accessories. The grooming compartment may have a handle to enable a user to lift the grooming compartment easily.

A flexible side wall extends from the top member down to the base. In various embodiments, the side wall is a curtain similar to a shower curtain. One or more holes may be provided in the curtain to allow a user to pass his or her hands through the holes to access the nozzle to wash and groom a pet. The curtain is movably and removably mounted on a track in the top member.

The base may have a cavity for collecting used water. The cavity is open to the top, and may be shaped so that water will drain toward a low point where the pump will intake used water.

In various embodiments, the apparatus includes a drain tray which covers a cavity in the base. The drain tray has drain holes in it to allow used water to drain through a screen to the cavity of the base. From there, a pump pumps water out of the cavity through an exit line and through a water line adapter which can be fixed to the base or mechanically attached to another hose which may be directed to a drain or a waste reservoir. The drain tray may have tie-down rings to enable a user to secure a pet with straps or some other device.

The base may further include extension legs so that the height of the unit can be adjusted by a user, and a handle and a pair of wheels so that the unit can be easily moved, especially in a collapsed mode.

Still other objects and advantages of the present invention will become readily apparent to those skilled in the art from the following detailed description, wherein it is shown and described only the preferred embodiments of the invention, simply by way of illustration of the best mode contemplated of carrying out the invention. As will be realized, the invention is capable of other and different embodiments and its several details are capable of modifications in various obvious respects, without departing from the invention. Accordingly, the drawings, wherein like reference numerals represent like features, and description are to be regarded as illustrative in nature and not as restrictive.

DETAILED DESCRIPTION OF THE INVENTION

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

The present invention is a self-contained pet washing and grooming apparatus 10. The apparatus includes a base 15 which is substantially impermeable to water. A first side support member 20 extends upward from the base 15 to top member 25. In various embodiments, a second side support member 30 extends upward from the base 15 to top member 25. First and second side support members extend diagonally between base 15 and top member 25. Together, side support members 20 and 30 may form rigid rod supports such as a scissor lift or telescoping lift and have two ends with a first end connected to and extending from base 15. In various embodiments, a second end is connected to and substantially supports top member 25.

Figure 1:
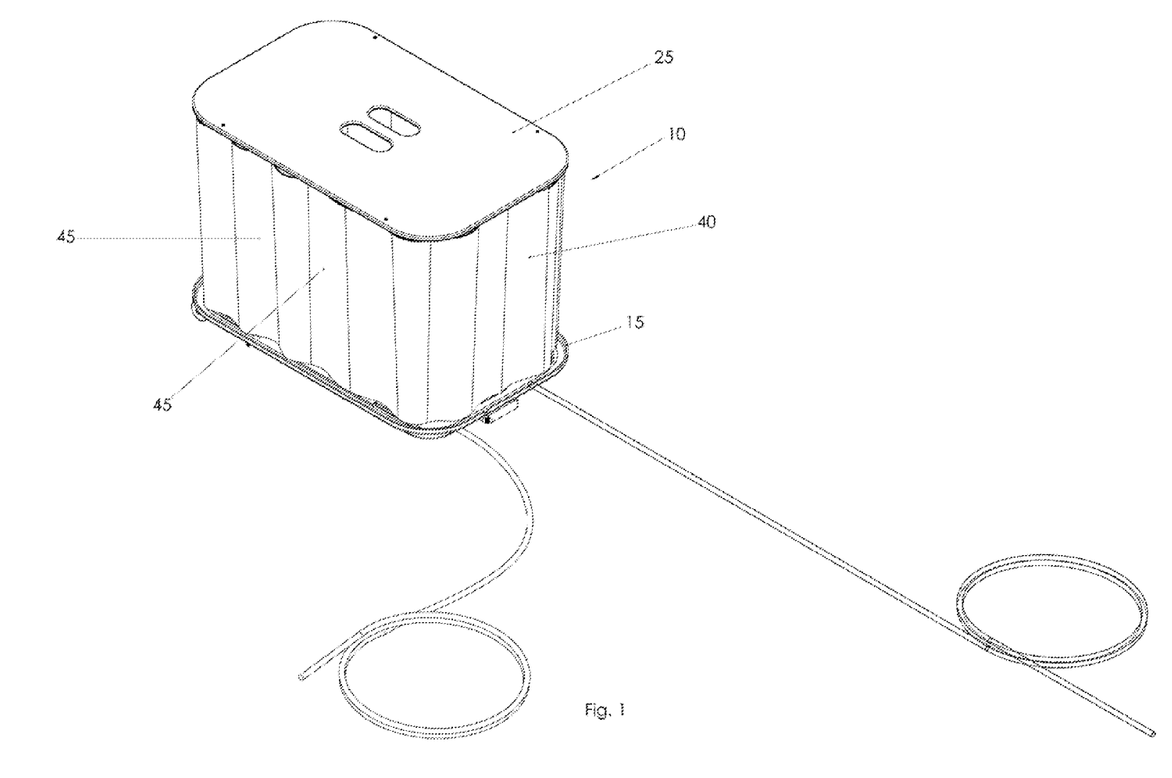
FIG. 1 shows a perspective view of the apparatus of the present invention.
Figure 2:
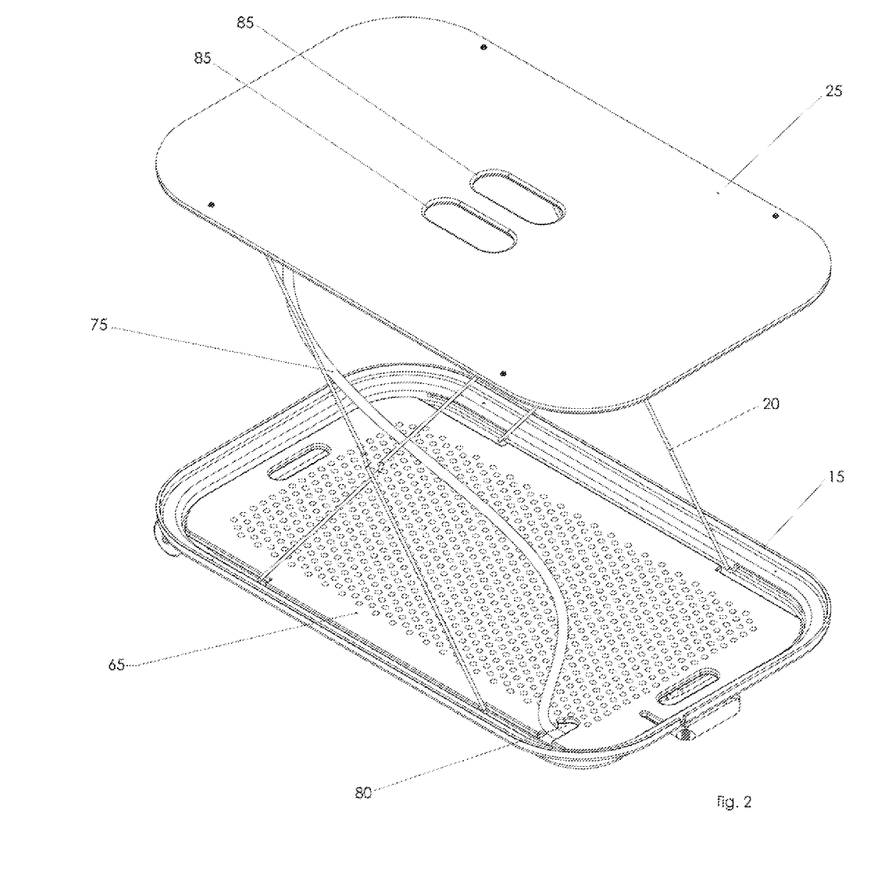
FIG. 2 shows another perspective view of the apparatus of the present invention without the flexible side wall attached.
Figure 3:
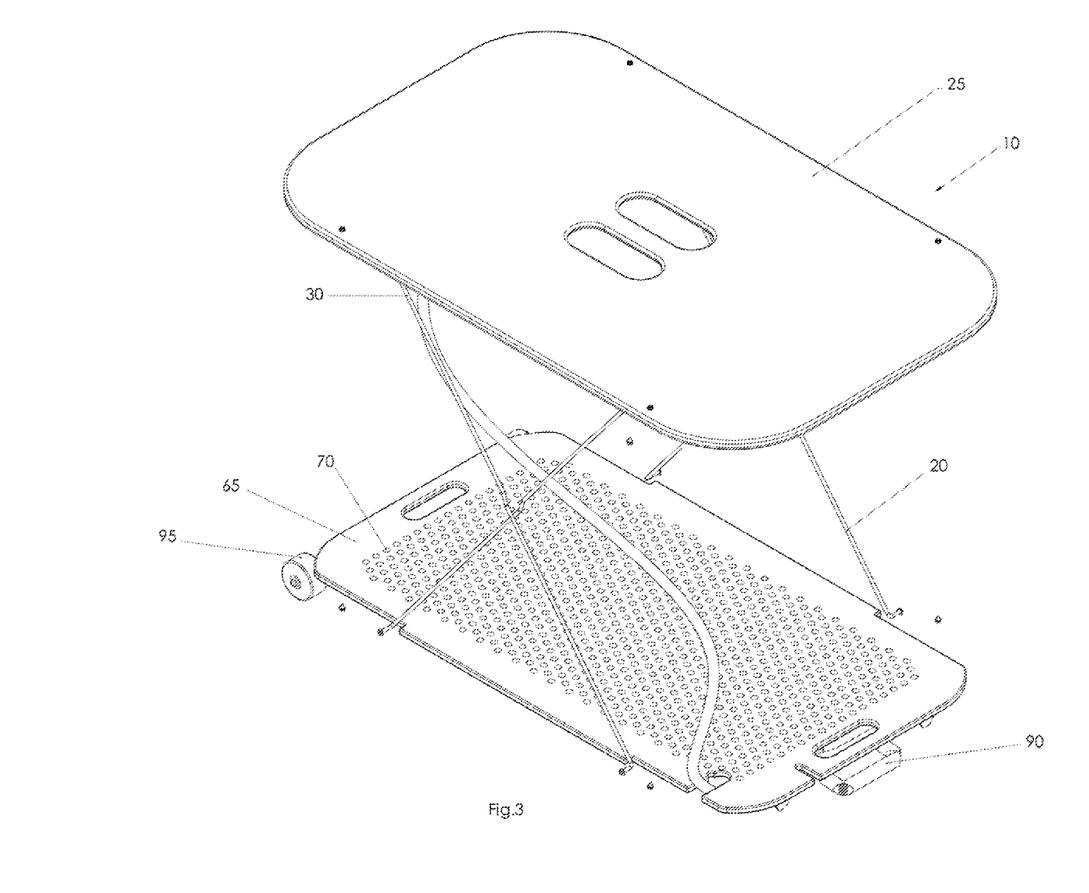
FIG. 3 shows a perspective view of the apparatus of the present invention without the base.
Figure 4:
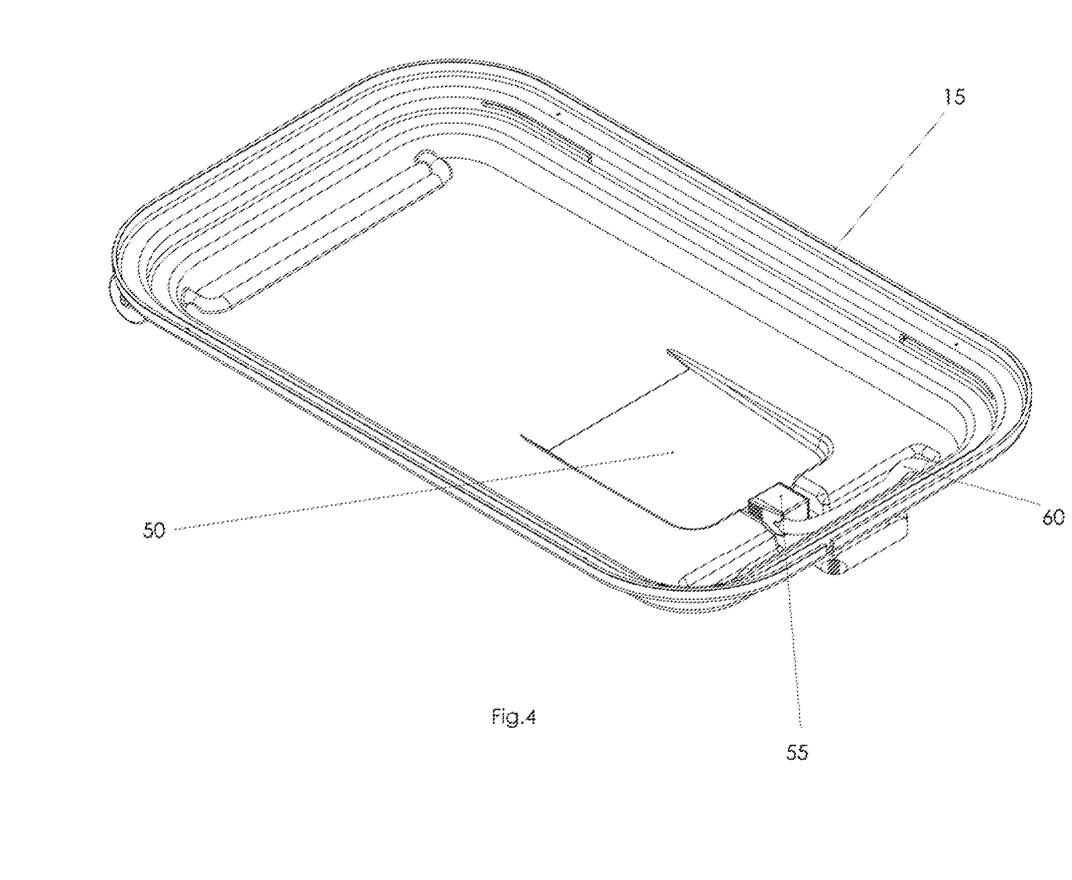
FIG. 4 shows a perspective view of the base of the apparatus of the present invention.
Figure 5:
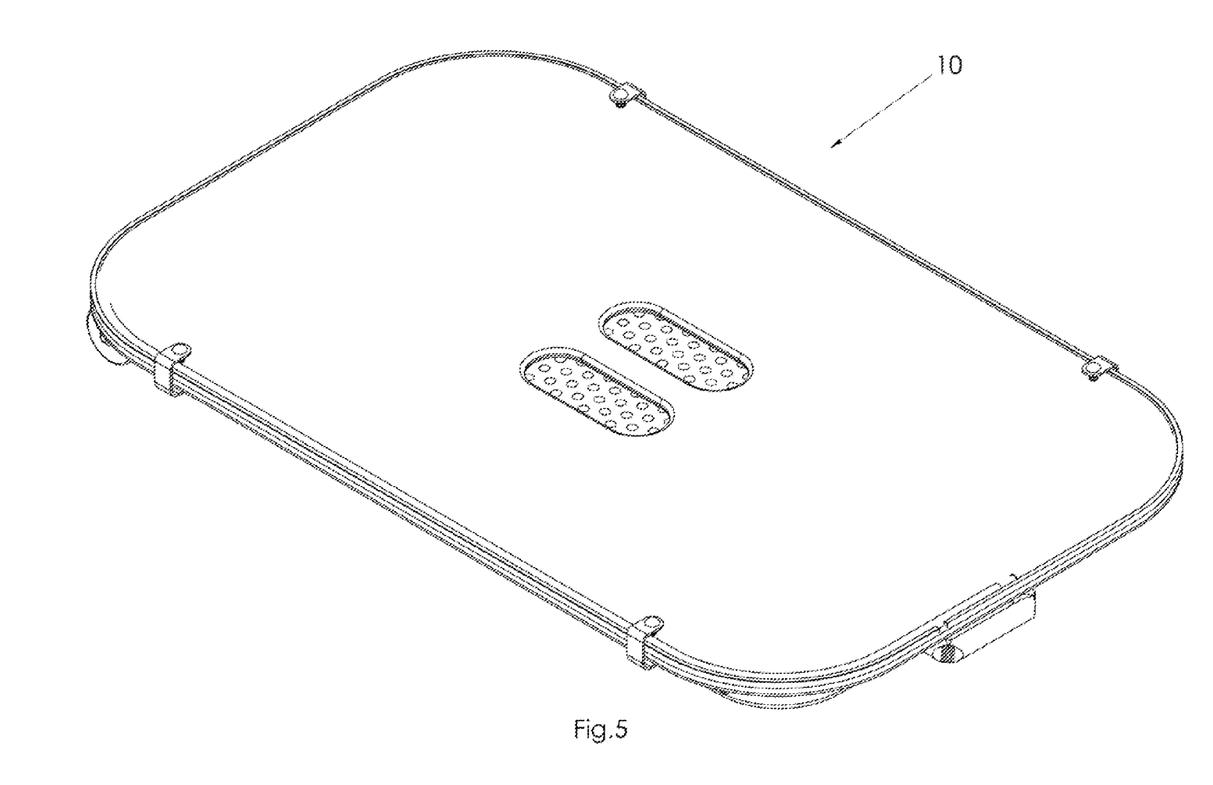
FIG. 5 shows a perspective view of the apparatus of the present invention in collapsed form.
Figure 6:
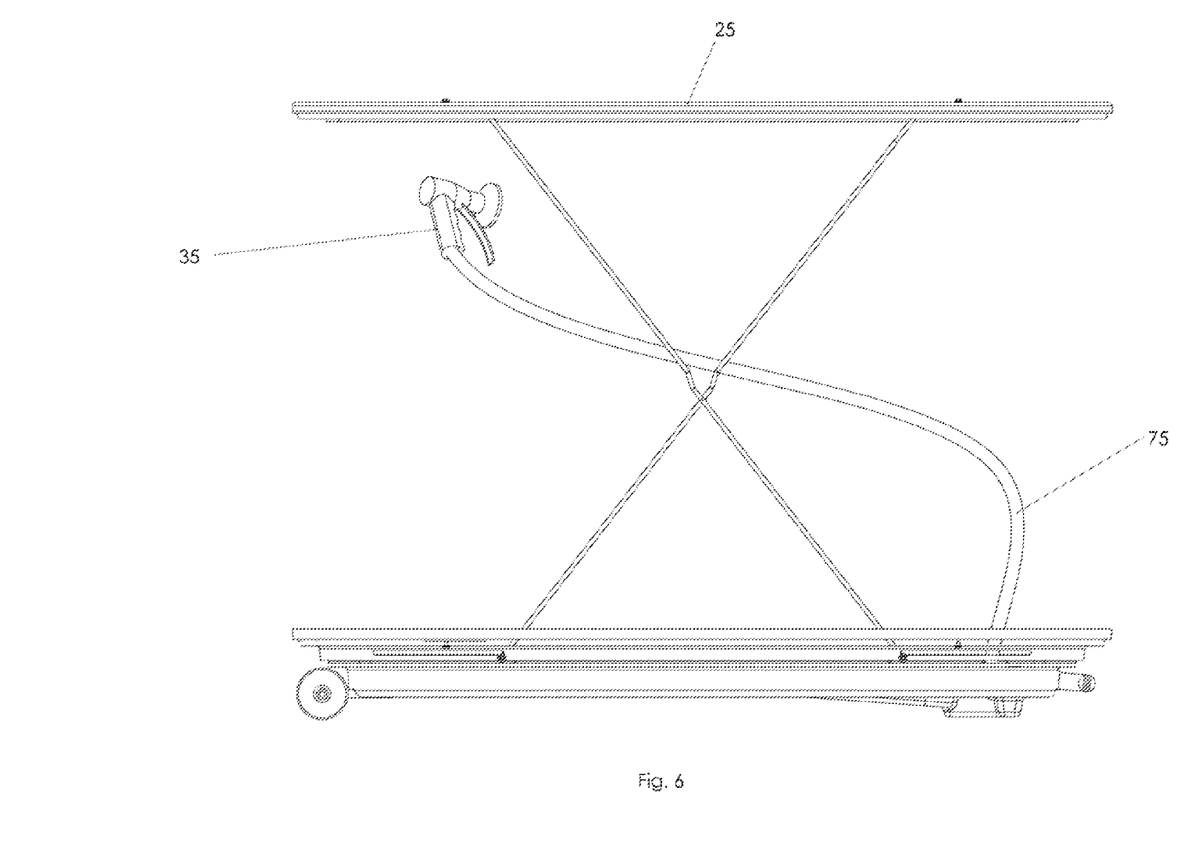
FIG. 6 shows a side view of the apparatus of the present invention without the side wall.
Figure 7:
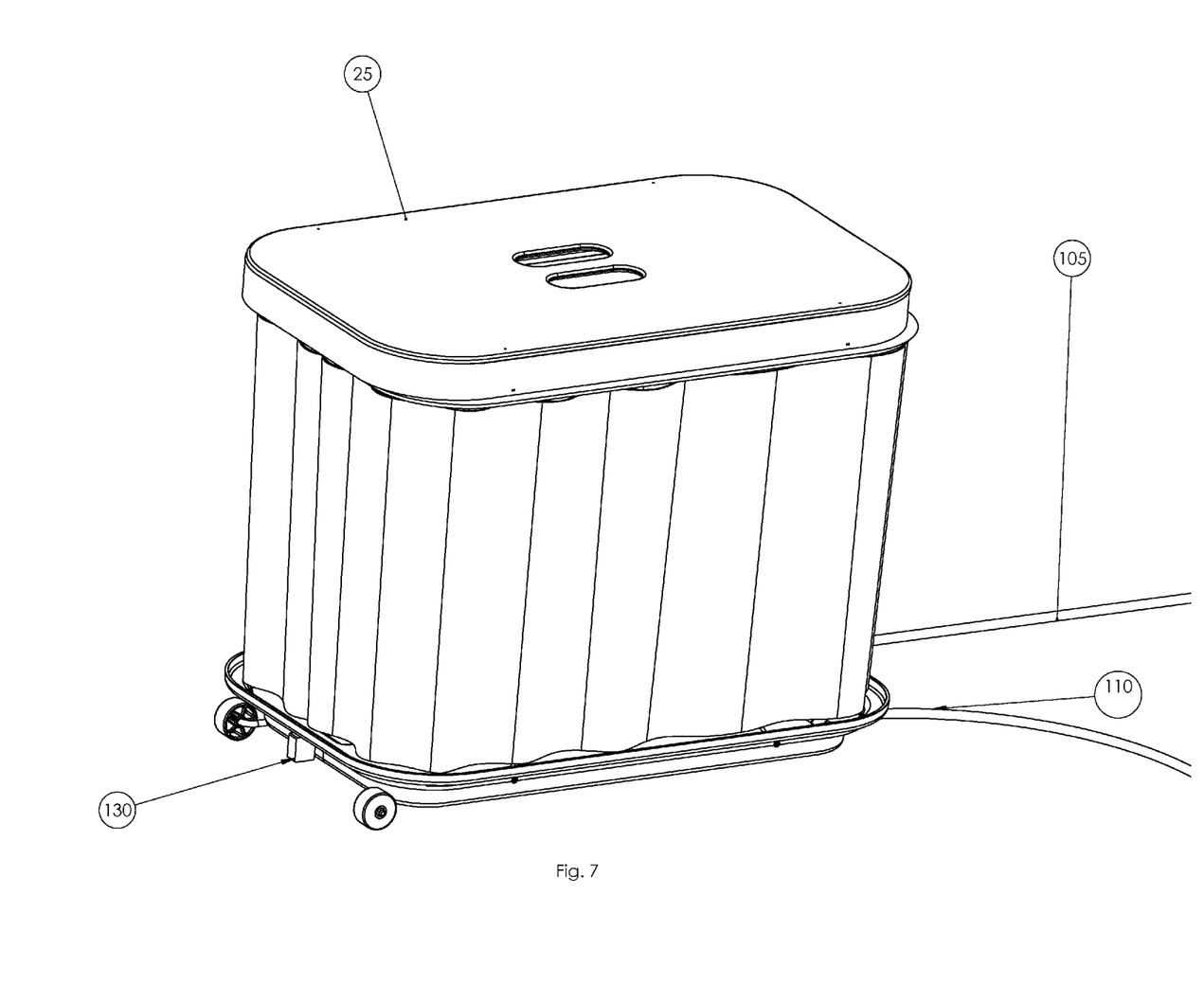
FIG. 7 shows a perspective view of the apparatus of the present invention with the grooming compartment.
Figure 8:
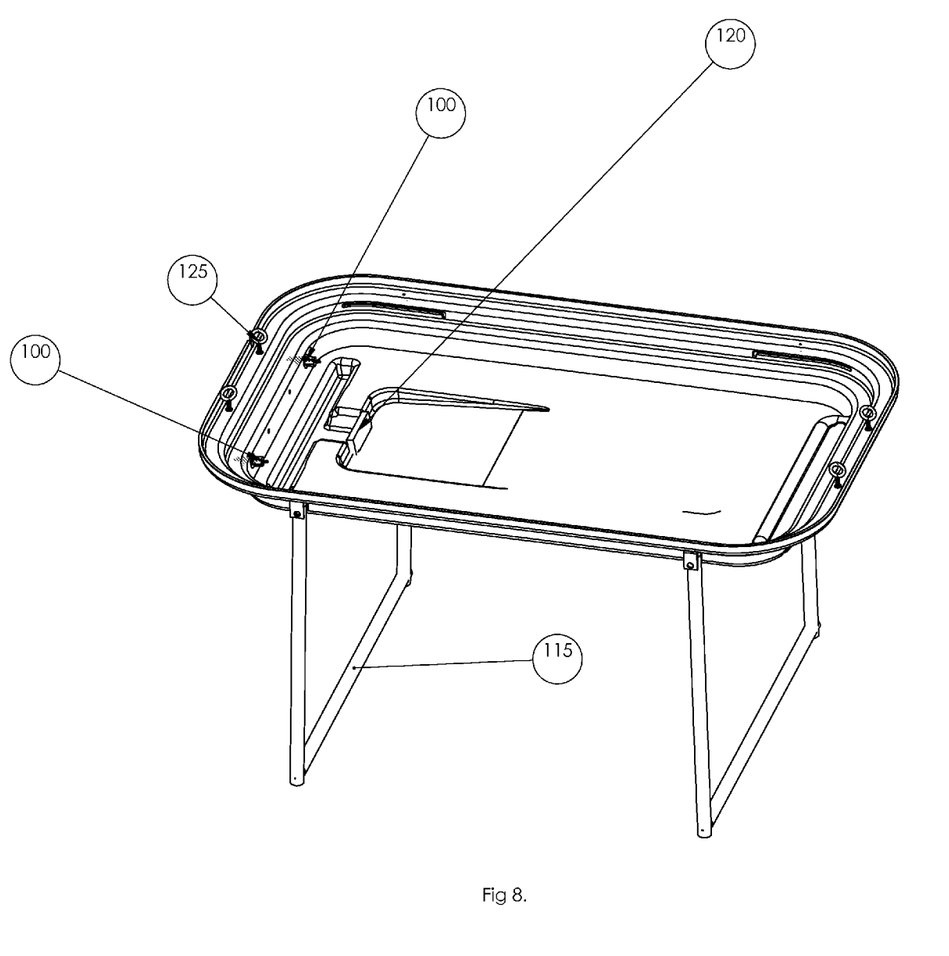
FIG. 8 shows a perspective view of the apparatus of the present invention with the extension legs.

The side support members 20 and 30 support the top member 25. Side support members 20 and 30 may be attached to the top member 25 via a track in top member 25. Ideally, side support members 20 and 30 are collapsible. The side support members may ride within a track or notches in the base 15, and collapse into the base 15 in a collapsed mode. Ideally, the top member 25 is supported above and parallel to the base 15 in the collapsed mode, as shown in FIG. 5. Top member 25 and the base 15 are approximately the same shape and size so that top member 25 is able to nest within the base 15.

A water dispensing device 35 is disposed above the base 15. The water dispensing device may be any device which is suitable to dispense water in a usable fashion, such as a showering means. For example, a nozzle, a spray nozzle, or even a water outlet of any type may be used. The water dispensing device 35 may be movably or removably mounted below the top member 25.

The top member 25 may be a cover and a container. For example, grooming tools such as a dryer, clippers, shampoo or accessories can be stored. Top member 25 sits on side wall 40. Ideally, the top member 25 is detachable and has a handle, or has one or more holes 85 at a center portion to facilitate easy grasping of the top member 25.

A flexible side wall 40 extends substantially between the top member 25 and the base 15. The flexible side wall 40 helps to prevent water from splashing out of the apparatus 10 during use. Ideally, the flexible side wall 40 is movably and removably mounted on a track on the top member 25 and base 15. The flexible side wall 40 on a track allows for the ingress and egress of an animal. In various embodiments, the side wall 40 is a curtain similar to a shower curtain.

In various preferred embodiments, the side wall 40 is movable and removable, and the side supports 20 and 30 are collapsible and collapse in such a way that the drain tray 65, side supports 20 and 30, and top cover 25 fit into the base 15 in a collapsed mode. One or two holes on each side of the unit 45 are ideally provided in the side wall 40 to allow a user to pass his or her hands through the side wall 40 in order to wash or groom a pet.

The base 15 ideally includes a cavity 50 to collect water. The cavity 50 is preferably open to the top. A pump 55 is disposed in the base 15, preferably in cavity 50. The pump 55 pumps water to pass through a water line adapter 100. The water line adapter 100 then goes to an outlet hose 105 that extends to a drain, such as a sink drain. Thus, used bathing water can be pumped out of the apparatus 10 and into a drain or waste reservoir for disposal.

An inlet hose 110 brings water to a water line adapter 100 attached to the base 15 to bring water to the water line 75 to the water dispensing device 35. The water line 75 may bring water from a water source such as a sink faucet, hose, spigot or reservoir. The water line adapter 100 is connected to the water line 75 and may pass through a passageway 80 in the drain tray 65.

The apparatus 10 preferably includes a drain tray 65. The drain tray 65 includes drain holes 70 which allow water to pass through a screen 120 to the base 15. The screen 120 may be used to filter pet hair from water that goes through the drain tray 65. The drain tray 65 is removably disposed upon the base 15, and is ideally substantially rigid to withhold pressure from the weight of a pet. The base 15 may have tie-down rings 125 to allow straps or some other device to be used to help secure a pet for harnessing means in the apparatus 10. In the collapsed mode, the drain tray 65 fits within the base 15.

The base 15 includes a power source 130 connected to the base 15 to allow electricity on the unit. For example, voltages of 12, 24 or 110-220 may be used. The power source may provide power for devices such as a pump, dryer or other tools to aid with grooming an animal. Ideally, the base 15 includes a handle 90, extension legs 115 and wheels 95 so that the apparatus 10 can be easily made portable and easily stored in its collapsed mode.

The base includes attached extension legs 115 to allow flexibility. The legs can be folded underneath the base 15. The folded legs allow for the height of the apparatus 10 to be raised in order to allow convenience for a user when bathing or grooming a pet.

Thus, the apparatus 10 may be conveniently and efficiently used to wash and groom a pet, and can be collapsed and easily stored. The collapsed apparatus 10 shown in FIG. 5 is highly compact and portable. Parts are also easily cleaned.

While specific embodiments have been illustrated and described, numerous modifications come to mind without significantly departing from the spirit of the invention and the scope of protection is limited by the scope of the accompanying claims.

What is claimed is:

1. A self-contained pet washing and grooming apparatus comprising:
    a base substantially impermeable to water,
    a top member supported above and parallel to said base,
    a first and second side support member each including rigid rod supports,
    wherein said rod supports have two ends with a first end connected to and extending from said base, and a second end connected to and substantially supporting said top member,
    wherein said first and second side support members extend diagonally between said base and said top member,
    wherein said side support members are collapsible, and
    wherein said top member and said base are approximately the same shape and size so that the said top member is able to nest within said base.

2. The pet washing and grooming apparatus according to claim 1, further comprising a water dispensing device for showering means disposed above said base.

3. The pet washing and grooming apparatus according to claim 2, wherein said water dispensing device is a nozzle movably and removably mounted to said top member.

4. The pet washing and grooming apparatus according to claim 3, wherein said water dispensing device facilitates a connection to an internal and external water source.

5. The pet washing and grooming apparatus according to claim 4, further comprising said top member is a cover that rests on a side wall and encloses said apparatus.

6. The pet washing and grooming apparatus according to claim 5, wherein said top member further comprises at least one hole in a center portion thereof adapted to form a lifting access.

7. The pet washing and grooming apparatus according to claim 6, further comprising a flexible side wall extending substantially between said top member and said base, wherein a flexible side wall helps contain water within said apparatus.

8. The pet washing and grooming apparatus according to claim 7, wherein said side wall is movable and removable on said top member and said base, and wherein said side supports are collapsible so that top member and drain tray fit into said base.

9. The pet washing and grooming apparatus according to claim 8, wherein said side wall is a flexible curtain extending from and movably and removably mounted to a track in said top member and said base to allow for the ingress and egress of an animal into said apparatus.

10. The pet washing and grooming apparatus according to claim 9, wherein said curtain has at least one hole therethrough adapted to enable a user to pass the user's hand therethrough.

11. The pet washing and grooming apparatus according to claim 8, further comprising said drain tray has holes for the passage of water and is disposed and removably disposed on top of said base.

12. The pet washing and grooming apparatus according to claim 11, wherein said drain tray has coupling rings.

13. The pet washing and grooming apparatus according to claim 12, wherein said drain tray allows water to pass through a screen to said base and wherein in a folded mode said drain tray fits into said base.

14. The pet washing and grooming apparatus according to claim 13, wherein said drain tray comprises a passageway for said water line, and wherein said water line enters through said base and passes through a pump to a water line adapter to an outlet hose to a plumbing fixture.

15. The pet washing and grooming apparatus according to claim 14, wherein said base includes a cavity to collect water that flows to the top of said base adapted to contain a volume of water, and further comprising said pump adapted to pump water from said cavity to said water line adapter.

16. The pet washing and grooming apparatus according to claim 15, further comprising said water line adapter that connects to said outlet hose that extends to said drain and wherein used water can be pumped out of said apparatus into a drain or waste reservoir.

17. The pet washing and grooming apparatus according to claim 16, further comprising said inlet hose that brings water to said water line adapter attached to said base that brings water to said water line to said water dispensing device and wherein said water line brings water from a water source.

18. The pet washing and grooming apparatus according to claim 17, further comprising said water line adapter connected to said water line that passes through a passageway to said drain tray.

19. The pet washing and grooming apparatus according to claim 18, wherein said base further comprises a power supply.

20. The pet washing and grooming apparatus according to claim 19, wherein said base further comprises independent support means that fold, and wherein said base further comprises an arm on one end and moves tram so that said apparatus can be folded and dragged on said tram whereby a user can wash and groom a pet in a convenient, sanitary and self-contained unit that is portable and collapsible.

* * * * *